US012633589B2

(12) United States Patent
Matsui et al.

(10) Patent No.: US 12,633,589 B2
(45) Date of Patent: May 19, 2026

(54) POWER SUPPLY DEVICE HAVING A CONTROL DEVICE THAT CALCULATES A FIRST INDEX INDICATING AN AMOUNT OF DECREASE IN AN ELECTROLYTE SOLUTION

(71) Applicant: TOYOTA JIDOSHA KABUSHIKI KAISHA, Toyota (JP)

(72) Inventors: Takaaki Matsui, Seto (JP); Hiroki Nagai, Aichi-ken (JP); Hiroki Iguchi, Nagakute (JP); Koichiro Isobe, Seto (JP); Daisuke Okanishi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 536 days.

(21) Appl. No.: 18/143,855

(22) Filed: May 5, 2023

(65) Prior Publication Data

US 2023/0395891 A1    Dec. 7, 2023

(30) Foreign Application Priority Data

Jun. 7, 2022    (JP) ................................. 2022-092121

(51) Int. Cl.
H01M 10/633 (2014.01)
H01M 10/48 (2006.01)
H01M 10/42 (2006.01)

(52) U.S. Cl.
CPC ....... H01M 10/633 (2015.04); H01M 10/486 (2013.01); *H01M 2010/4278* (2013.01)

(58) Field of Classification Search
CPC ..... H01M 10/44; H01M 10/446; Y02E 60/10;

H02J 7/0068; H02J 7/0071; H02J 7/007; H02J 7/00712; H02J 7/00714; H02J 7/00716; H02J 7/00718; H02J 7/007182; H02J 7/007184; H02J 7/008; H02J 7/0031;

(Continued)

(56) References Cited

U.S. PATENT DOCUMENTS 6,225,785 B1 *  5/2001  Au ....................... G01R 31/385
                                                      320/147
7,358,701 B2 *  4/2008  Field ........................ H02J 7/00
                                                      320/155

(Continued)

FOREIGN PATENT DOCUMENTS

JP      2017-157280 A      9/2017
JP      2021-061119 A      4/2021

*Primary Examiner* — Crystal L Hammond
*Assistant Examiner* — Nusrat Quddus
(74) *Attorney, Agent, or Firm* — Dinsmore & Shohl LLP

(57)            ABSTRACT

A power supply device includes a secondary cell, a detection device, a storage device, and a control device. The secondary cell includes an electrolyte solution. The detection device detects the voltage and temperature of the secondary cell. The storage device stores first information and second information. The first information indicates the relationship among the voltage, the temperature, and the amount of decrease in the electrolyte solution during energization of the secondary cell. The second information indicates the relationship among the voltage, the temperature, and the amount of decrease in the electrolyte solution during storage of the secondary cell. The control device calculates a first index indicating the amount of decrease in the electrolyte solution.

8 Claims, 4 Drawing Sheets

(58) Field of Classification Search
CPC ........ H02M 3/073; H02M 3/10; H02M 3/135; H02M 3/137; H02M 3/28; H02M 3/315; H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 1/10; H02M 3/33561; H02M 7/003; G06F 1/263; H01L 25/112; H01L 25/115; H01L 23/34; H01R 13/6675; H01R 29/00; H01R 31/065; G09G 3/20; H02K 11/046; H01F 2027/406; H05K 7/20927

See application file for complete search history.

(56) References Cited

U.S. PATENT DOCUMENTS

| | | | | |
|---|---|---|---|---|
| 8,102,155 B2* | 1/2012 | Muraoka | ........... | H01M 10/0525 320/136 |
| 8,786,258 B2* | 7/2014 | Park | ...................... | H02J 7/0063 320/135 |
| 9,304,172 B2* | 4/2016 | Sugimura | ............. | H01M 10/44 |
| 10,809,302 B2* | 10/2020 | Yuan | ..................... | H01M 10/48 |
| 11,909,061 B2* | 2/2024 | DeKeuster | ........... | H01M 4/485 |
| 2005/0206348 A1* | 9/2005 | Tsuchiya | ........... | H02J 7/007184 320/156 |
| 2006/0238203 A1* | 10/2006 | Kelley | ................ | G01R 31/389 324/433 |
| 2012/0176097 A1* | 7/2012 | Takezawa | ........... | H01M 10/448 320/134 |

* cited by examiner

FIG. 4

TEMPERATURE (Tb)

Tx Tx1 • • • • • • • • • • • • • • • • • • Ty1 Ty

Vx
Vx1
·
·
VOLTAGE (Vb)   ·     MAP OF AMOUNT OF DECREASE
·                IN ELECTROLYTE SOLUTION
·                      (PER UNIT TIME)
·
Vy1
Vy

POWER SUPPLY DEVICE HAVING A CONTROL DEVICE THAT CALCULATES A FIRST INDEX INDICATING AN AMOUNT OF DECREASE IN AN ELECTROLYTE SOLUTION

CROSS-REFERENCE TO RELATED APPLICATION

This application claims priority to Japanese Patent Application No. 2022-092121 filed on Jun. 7, 2022, incorporated herein by reference in its entirety.

BACKGROUND

1. Technical Field

The present disclosure relates to power supply devices.

2. Description of Related Art

Japanese Unexamined Patent Application Publication No. 2017-157280 (JP 2017-157280 A) discloses a battery pack. The amount of gas generated by decomposition of a non-aqueous electrolyte solution of a lithium-ion cell is detected. The amount of decomposed non-aqueous electrolyte solution is estimated based on the amount of detected gas and a preset correlation between the amount of decomposed non-aqueous electrolyte solution and the amount of generated gas. Japanese Unexamined Patent Application Publication No. 2021-061119 (JP 2021-061119 A) discloses an estimation device for a battery.

SUMMARY

For example, it is known that, in a secondary cell having an electrode assembly that has a relatively high aspect ratio and in which electrodes are bonded to a separator, gas generated by decomposition of an electrolyte solution tends to remain in the electrode assembly. Therefore, the amount of decomposed electrolyte solution (amount of decrease in electrolyte solution) in a secondary cell containing such an electrode assembly may not be able to be accurately estimated by the technique disclosed in JP 2017-157280 A.

The present disclosure provides a device that accurately estimates the amount of decrease in electrolyte solution of a secondary cell.

A power supply device according to a first aspect of the present disclosure includes: a secondary cell including an electrolyte solution; a detection device configured to detect a voltage of the secondary cell and a temperature of the secondary cell; a storage device configured to store first information indicating a relationship among the voltage of the secondary cell, the temperature of the secondary cell, and an amount of decrease in the electrolyte solution during energization of the secondary cell, and second information indicating a relationship among the voltage of the secondary cell, the temperature of the secondary cell, and the amount of decrease in the electrolyte solution during storage of the secondary cell; and a control device configured to calculate a first index indicating the amount of decrease in the electrolyte solution. The first index includes a second index indicating the amount of decrease in the electrolyte solution due to energization of the secondary cell, and a third index indicating the amount of decrease in the electrolyte solution due to storage of the secondary cell. The control device is configured to calculate the second index based on the voltage and the temperature detected by the detection device and the first information, when the secondary cell is energized, and calculate the third index based on the voltage and the temperature detected by the detection device and the second information, when the secondary cell is stored.

According to the above configuration, when the secondary cell is energized, the second index is calculated based on the detected voltage and temperature and the first information. When the secondary cell is stored, the third index is calculated based on the detected voltage and temperature and the second information. The first index indicating the amount of decrease in the electrolyte solution is calculated by accumulating the second and third indices. The amount of decrease in the electrolyte solution can be estimated based on the first index. Since the amount of decrease in the electrolyte solution can thus be estimated using the detected voltage and temperature, the amount of decrease in the electrolyte solution can be accurately estimated for various secondary cells including an electrolyte solution.

The first information may be created based on results of a cycle test of the secondary cell performed for each temperature. The second information may be created based on results of a storage test of the secondary cell performed for each temperature and each voltage.

According to the above configuration, the first information and the second information can be appropriately created. The second index and the third index can therefore be accurately calculated by using the first information and the second information. Accordingly, the first index can be accurately calculated. As a result, the amount of decrease in the electrolyte solution of the secondary cell can be accurately estimated.

The control device may be configured to output a command to notify an alert when the first index is greater than a first threshold.

The first threshold is set to, for example, a value indicating that the amount of electrolyte solution is zero plus a certain margin. Since a command to notify an alert is output when the first index is greater than the first threshold, it is possible to alert the user.

The control device may be configured to output a command to limit input and output power of the secondary cell when the first index is equal to or less than the first threshold and greater than a second threshold that is smaller than the first threshold.

According to the above configuration, when the first index is equal to or less than the first threshold but is greater than the second threshold, the input and output power of the secondary cell is limited. Therefore, it is possible to slow down the decrease in the electrolyte solution.

The control device may be configured to output a command to limit an upper limit voltage value of the secondary cell when the first index is equal to or less than the second threshold and greater than a third threshold that is smaller than the second threshold.

According to the above configuration, when the first index is equal to or less than the second threshold but is greater than the third threshold, the upper limit voltage value of the secondary cell is limited. Therefore, it is possible to slow down the decrease in the electrolyte solution.

The secondary cell may include an electrode assembly having an aspect ratio of 1.5 or more. The electrode assembly may be composed of a stack of a positive electrode, a negative electrode, and a separator located between the positive electrode and the negative electrode. The separator may include a functional layer having a function to bond the positive electrode and the negative electrode to the separator.

Even in the secondary cell including the electrode assembly that has a relatively high aspect ratio (1.5 or more) and in which the electrodes are bonded to the separator, the amount of decrease in the electrolyte solution can be accurately estimated.

According to the present disclosure, the amount of decrease in electrolyte solution of a secondary cell can be accurately estimated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 shows an example of the first map; and

DETAILED DESCRIPTION OF EMBODIMENTS

An embodiment of the present disclosure will be described in detail below with reference to the drawings. The same or corresponding portions are denoted by the same signs throughout the drawings, and description thereof will not be repeated.

Overall Configuration of Power System

Figure 1:
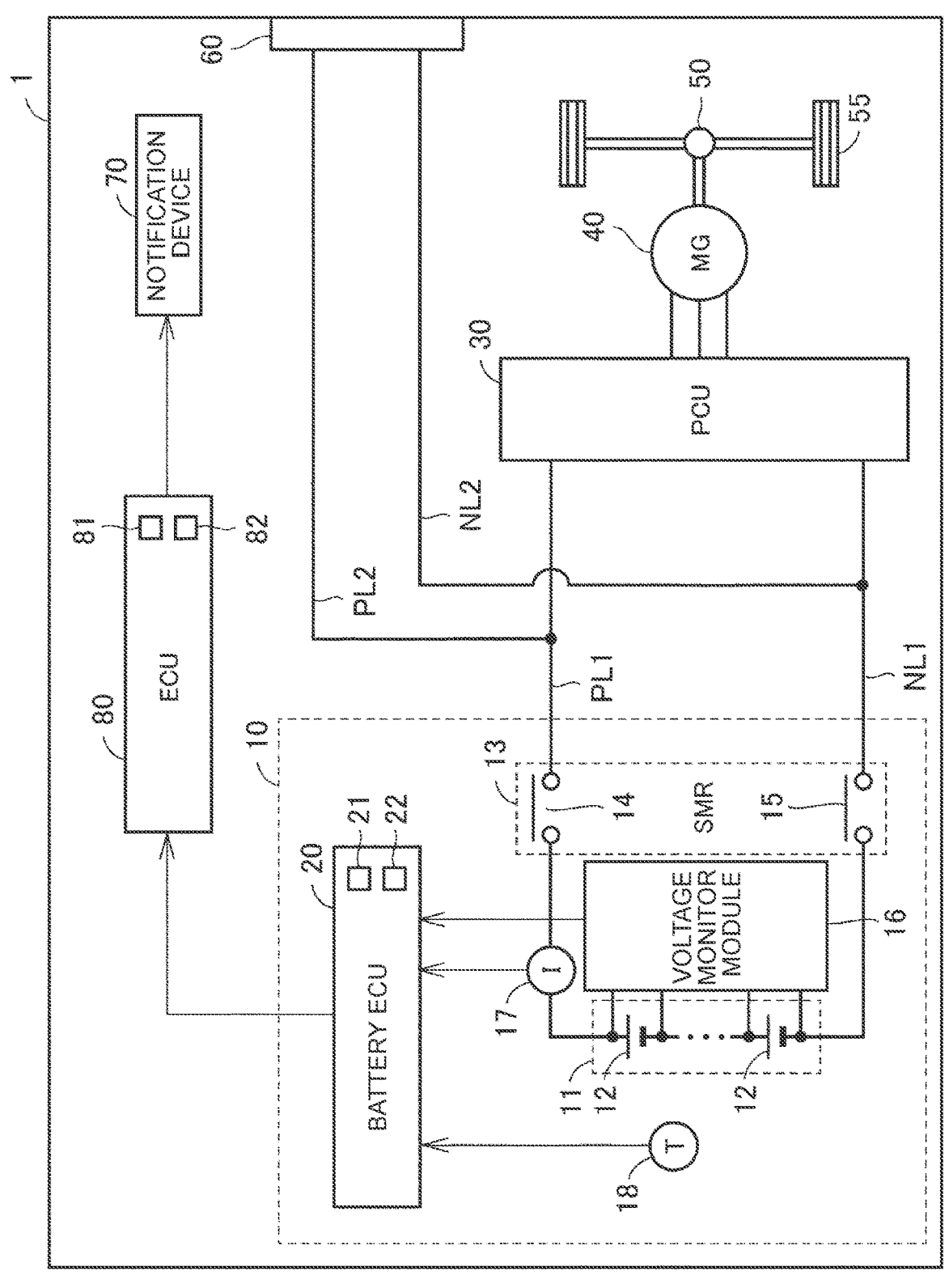
FIG. 1 shows a schematic configuration of a vehicle according to an embodiment.

FIG. 1 shows a schematic configuration of a vehicle 1 according to the present embodiment. The vehicle 1 according to the present embodiment is a battery electric vehicle (BEV) capable of direct current (DC) charging. In DC charging, DC power from a power supply (not shown) outside the vehicle 1 is supplied to the vehicle 1 to charge an in-vehicle battery 11. The vehicle 1 may be of any type as long as the vehicle 1 is equipped with a battery pack, and is not limited to the battery electric vehicle. The vehicle 1 may be a hybrid electric vehicle (HEV), a plug-in hybrid electric vehicle (PHEV), or a fuel cell electric vehicle (FCEV). The vehicle 1 may be capable of alternating current (AC) charging. In AC charging, AC power from a power supply outside the vehicle 1 is supplied to the vehicle 1 to charge the in-vehicle battery 11.

The vehicle 1 includes a battery pack 10, a power control unit (PCU) 30, a motor generator 40, a power transmission gear 50, drive wheels 55, an inlet 60, a notification device 70, and an electronic control unit (ECU) 80.

The battery pack 10 and the PCU 30 are electrically connected to each other through power lines PL1, NL1. The battery pack 10 includes a battery 11, a system main relay (SMR) device 13, a voltage monitor module 16, a current sensor 17, a temperature sensor 18, and a battery ECU 20. The battery pack 10 is an example of the "power supply device" according to the present disclosure.

The battery 11 is mounted on the vehicle 1 as a drive power source (i.e., a power source). The battery 11 includes a plurality of stacked cells 12. The cells 12 are secondary cells such as, for example, nickel metal hydride cells or lithium-ion cells. The cells 12 may be of any type as long as they have a liquid electrolyte (electrolyte solution) between a positive electrode and a negative electrode. The cells 12 may be non-aqueous electrolyte cells or aqueous electrolyte cells.

Figures 2, 3:
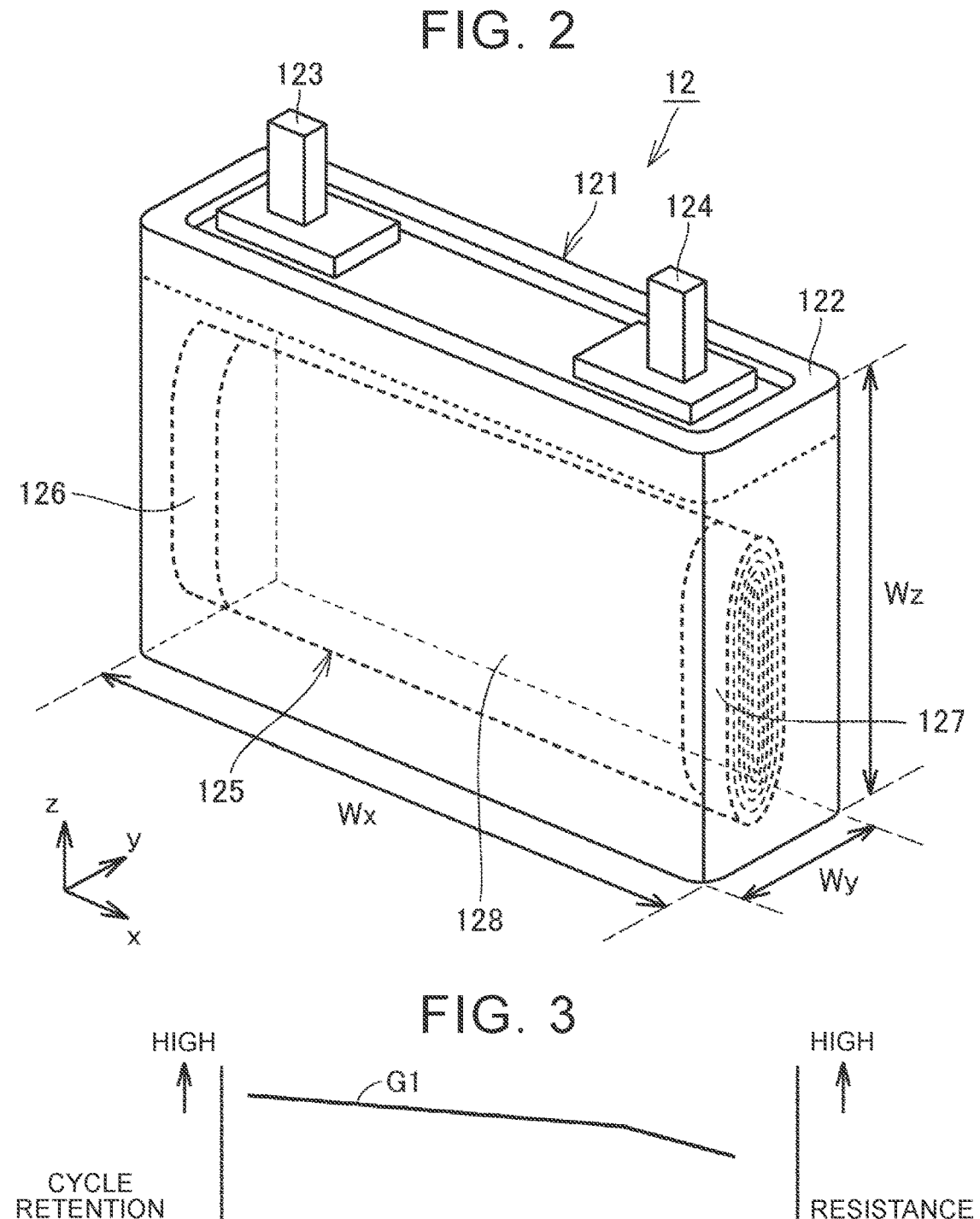
FIG. 2 illustrates the configuration of a cell in detail.
FIG. 3 is a graph illustrating a method for creating a first map.

FIG. 2 illustrates the configuration of the cell 12 in detail. In FIG. 2, the cell 12 is shown transparent so that the inside of the cell 12 is visible. The cell 12 includes a housing 121, a lid 122, a positive terminal 123, a negative terminal 124, and an electrode assembly 125 (shown by dashed lines).

The housing 121 has a rectangular shape (generally rectangular parallelepiped shape). Hereinafter, the direction of the long side (width direction) of the housing 121 is defined as x-axis direction, the depth direction (thickness direction) of the housing 121 is defined as y-axis direction, and the direction of the short side (height direction) of the housing 121 is defined as z-axis direction.

The lid 122 seals the upper surface of the housing 121. One ends of the positive terminal 123 and the negative terminal 124 protrude outward from the lid 122. The other ends of the positive terminal 123 and the negative terminal 124 are electrically connected to an internal positive terminal and an internal negative terminal (both not shown) inside the housing 121, respectively.

As shown in FIG. 2, the housing 121 has a housing width Wx, a housing depth (thickness) Wy, and a housing height (excluding the positive terminal 123 and the negative terminal 124) Wz when the upper surface of the housing 121 is sealed by the lid 122. The aspect ratio Ar of the cell 12 according to the present embodiment is given by the following expression (1).

$$\text{Aspect ratio } Ar = \text{housing width } Wx/\text{housing height } Wz \qquad (1)$$

The housing 121 of the cell 12 according to the present embodiment is configured to have an aspect ratio Ar of 1.5 or more. The electrode assembly 125 housed in the housing 121 is also configured to have an aspect ratio of 1.5 or more.

The electrode assembly 125 is formed by stacking a positive electrode 126 and a negative electrode 127 with a separator 128 interposed therebetween and winding the stack. The electrode assembly 125 is housed in the housing 121 such that the winding axis of the electrode assembly 125 extends in the width direction of the housing 121 (x-axis direction). An electrolyte solution is injected into the housing 121, infiltrates the electrode assembly 125, and is mainly held inside the electrode assembly 125. Although FIG. 2 shows an example in which the electrode assembly 125 is a wound electrode assembly, the electrode assembly 125 may be a stacked electrode assembly.

Known configurations and materials for a positive electrode, negative electrode, separator, and electrolyte solution of a lithium-ion secondary cell can be used for the positive electrode 126, the negative electrode 127, the separator 128, and the electrolyte solution. The separator 128 contains, for example, a binder having an adhesive function such as polyvinylidene fluoride (PVDF).

Referring back to FIG. 1, the system main relay device 13 is provided on the power lines PL1, NL1 that electrically connect the battery 11 and the PCU 30. The system main relay device 13 includes SMRs 14, 15. One end of the SMR 14 is electrically connected to a positive terminal of the battery 11, and the other end of the SMR 14 is electrically connected to the PCU 30. One end of the SMR 15 is electrically connected to a negative terminal of the battery 11, and the other end of the SMR 15 is electrically connected to the PCU 30.

The voltage monitor module 16 detects voltages Vb of the cells 12 included in the battery 11, and outputs a signal indicating the detection result to the battery ECU 20.

The current sensor 17 is provided between the positive terminal of the battery 11 and the SMR 14, and detects a current Ib that is input to and output from the battery 11. The current sensor 17 outputs a signal indicating the detection result to the battery ECU 20.

The temperature sensor 18 detects temperatures Tb of the cells 12 included in the battery 11, and outputs a signal indicating the detection result to the battery ECU 20.

The battery ECU 20 includes a processor 21 such as central processing unit (CPU), a memory 22 such as read-only memory (ROM) and random access memory (RAM), and an input and output port (not shown) for inputting and outputting various signals. The battery ECU 20 manages the battery 11 in cooperation with the ECU 80 based on the input of signals from the sensors (voltage monitor module 16, current sensor 17, and temperature sensor 18) and maps and programs stored in the memory 22. In the present embodiment, a main process that is performed by the battery ECU 20 is a process of calculating indices indicating the amounts of decrease in electrolyte solution in the cells 12 included in the battery 11 (hereinafter also referred to as "estimation process"). The estimation process that is performed by the battery ECU 20 will be described in detail later.

The PCU 30 includes, for example, an inverter and a converter (both not shown). The PCU 30 performs bidirectional power conversion between the battery pack 10 (battery 11) and the motor generator 40 in response to a control signal from the ECU 80.

The motor generator 40 is, for example, a three-phase AC rotating electrical machine with permanent magnets embedded in a rotor (not shown). The rotor of the motor generator 40 is mechanically connected to the drive wheels 55 via the power transmission gear 50. The motor generator 40 is driven with electric power supplied from the battery 11. The motor generator 40 can also generate electric power by regenerative braking. AC power generated by the motor generator 40 is converted to DC power by the PCU 30 to charge the battery 11.

The inlet 60 is configured to be connected to a connector provided at a distal end of a charging cable electrically connected to an external power supply (e.g., a charging station) (none of which are shown). Electric power supplied from the external power supply to the inlet 60 is supplied to the battery pack 10 (battery 11) via power lines PL2, NL2 and the power lines PL1, NL1. The power lines PL2, NL2 are provided with charging relays, not shown.

The notification device 70 includes either or both of a display device and an audio output device. The notification device 70 causes the display device to display information or causes the audio output device to output voice or sound (e.g., read information out loud), in response to a command from the ECU 80. For example, a navigation device may be configured to have the function of the notification device 70.

The ECU 80 includes a processor 81 such as CPU, a memory 82 such as ROM and RAM, and an input and output port (not shown) for inputting and outputting various signals. The ECU 80 controls the devices so as to bring the vehicle 1 to a desired state, based on the input of signals from the sensors mounted on the vehicle 1 and maps and programs stored in the memory 82. For example, the ECU 80 controls charging and discharging of the battery 11 by controlling the PCU 30.

It is known that, in secondary cells, an electrolyte solution is consumed during their use (energization) and storage. When the amount of electrolyte solution decreases and the electrolyte solution runs short, there is a portion where no electrolyte solution is present between the electrodes, which may make it difficult for a chemical reaction to occur. This may result in a decrease in cell capacity and an increase in internal resistance. It is therefore required to monitor the amount of decrease in electrolyte solution.

In the vehicle 1 according to the present embodiment, the battery ECU 20 performs the estimation process to calculate an index Easum indicating the amount of decrease in electrolyte solution of each cell 12. Specifically, the battery ECU 20 acquires the voltage Vb and current Ib of each cell 12 and the temperature Tb of each cell 12 (hereinafter also collectively referred to as "detection data") at every predetermined cycle (e.g., control cycle). The battery ECU 20 calculates the index Easum for each cell 12 based on the acquired values. Based on the indices Easum of the cells 12, the battery ECU 20 outputs to the ECU a command to limit an upper limit voltage of the battery 11, outputs to the ECU 80 a command to limit input and output power of the battery 11, or outputs to the ECU 80 a command to notify an alert.

A first map and a second map are stored in advance in the memory 22 of the battery ECU 20. The first map is a map for calculating an index Ea1 indicating the amount of decrease in electrolyte solution in each cell 12 per unit time during energization of the battery 11. The second map is a map for calculating an index Ea2 indicating the amount of decrease in electrolyte solution in each cell 12 per unit time during storage of the battery 11. The first map and the second map can be created in advance based on experimental results. The unit time is the predetermined cycle (e.g., control cycle) mentioned above. The first map is an example of the "first information" according to the present disclosure. The second map is an example of the "second information" according to the present disclosure. The index Easum is an example of the "first index" according to the present disclosure. The index Ea1 is an example of the "second index" according to the present disclosure. The index Ea2 is an example of the "third index" according to the present disclosure.

FIG. 3 is a graph illustrating a method for creating the first map. The abscissa in FIG. 3 represents the number of times a cycle test was performed (cycle count). The ordinates represent the cycle retention rate (capacity retention rate) and the resistance increase rate. Graph G1 shows the relationship between the cycle count and the cycle retention rate. Graph G2 shows the relationship between the cycle count and the resistance increase rate.

The inventors performed an energization cycle test for each temperature within a guaranteed temperature range of the cells 12. In the cycle test, a charge and discharge cycle was repeated at a lower limit voltage Vx, an upper limit voltage Vy (>Vx), and a predetermined current rate (e.g., 1C or less). Experimental results for desired temperatures can be obtained by setting a current rate to such a value that heat generation from charging and discharging can be ignored, such as 1C or less. In the cycle test, the inventors monitored the capacity retention rate and the internal resistance increase rate, and disassembled the cell during the cycle to examine the remaining amount of electrolyte solution. The experimental results including graphs G1, G2 shown in FIG. 3 were obtained as the experimental results of the cycle test for a certain temperature.

As shown in graph G2, it was found that the relationship between the cycle count and the resistance increase rate has an inflection point P at which the resistance increase rate increases sharply. The inventors found that the amount of electrolyte solution becomes zero at the inflection point P. By using the above experimental results, the amount of decrease in electrolyte solution per unit time for each set of voltage and temperature can be mapped based on the cycle count up to the inflection point P in graph G2. For example, in the case where the experimental results in FIG. 3 are the experimental results of the cycle test for a certain temperature Ta, a map shows the amount of decrease in electrolyte solution per unit time for each set of voltage Vx to Vy and temperature Ta. The amount of decrease in electrolyte solution per unit time may be set to the same value for each set of voltage Vx to Vy and temperature Ta. The higher the voltage, the more electrolyte solution is consumed. In view of this, the amount of decrease in electrolyte solution per unit time may be set to a larger value for a set including a higher voltage.

By conducting an experiment similar to that described above for temperatures (temperatures within the guaranteed temperature range) other than the temperature Ta, the amount of decrease in electrolyte solution per unit time for each set of voltage Vx to Vy and each temperature can be mapped. The first map is created by using the above data. That is, when the guaranteed temperature range of the cells 12 is temperatures Tx to Ty, the first map shows the amount of decrease in electrolyte solution per unit time for each set of voltage Vy to Vx and temperature Tx to Ty during energization.

Figure 4:
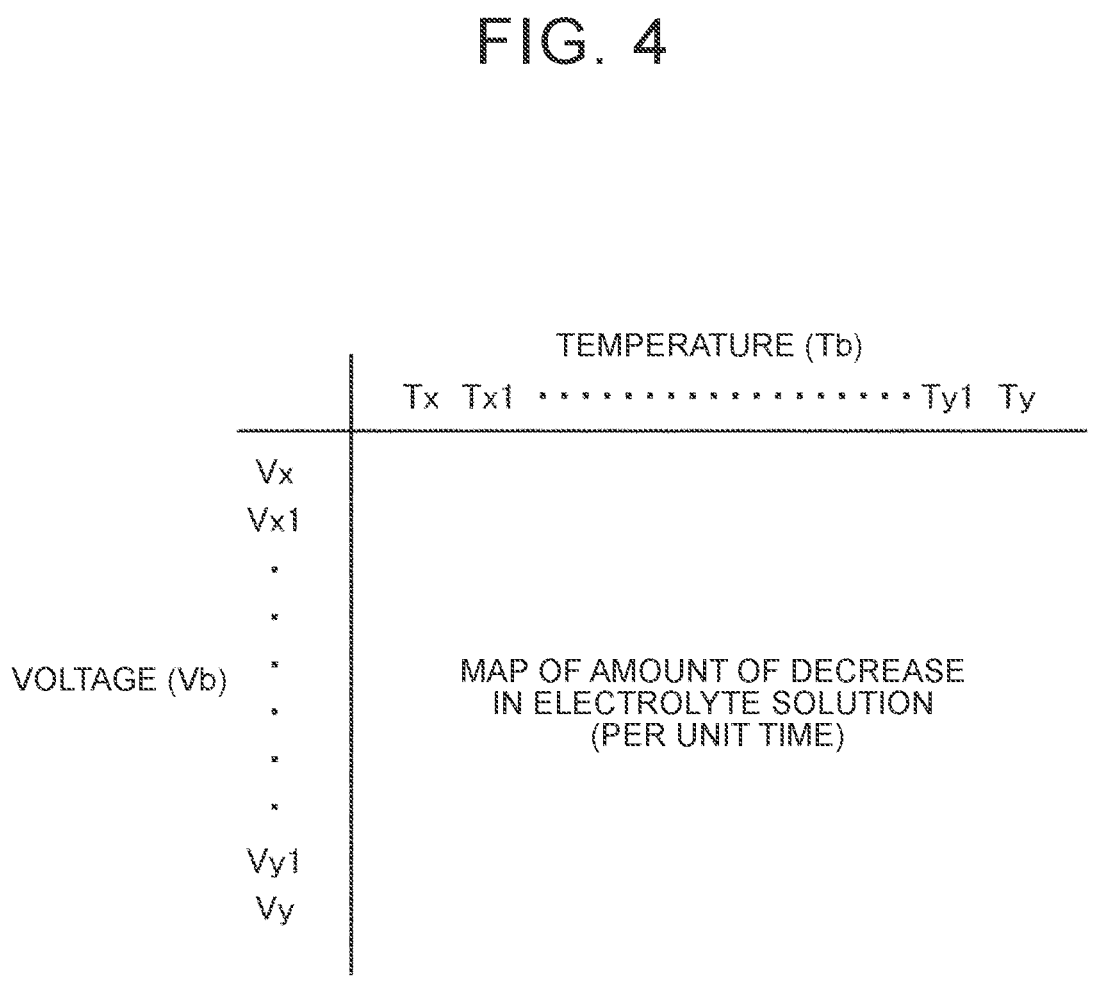

FIG. 4 shows an example of the first map. The first map shows a tendency that, for example, the higher the temperature and the higher the voltage, the larger the amount of decrease in electrolyte solution.

The inventors also performed a cell storage test for each temperature and each voltage within the guaranteed temperature range of the cells 12. In the storage test, the inventors monitored the capacity retention rate and the internal resistance increase rate as in the cycle test while maintaining a specific temperature and a specific voltage, and disassembled the cell during the test to examine the remaining amount of electrolyte solution. The second map can be created based on the experimental results of the storage test by a procedure similar to the procedure of creating the first map. The second map shows the amount of decrease in electrolyte solution per unit time for each set of voltage Vy to Vx and temperature Tx to Ty during storage.

The battery ECU 20 obtains the voltage Vb and the temperature Tb at every predetermined cycle (e.g., control cycle), and refers to the first map or the second map using the voltage Vb and the temperature Tb as arguments to calculate the index Ea1 or the index Ea2. For example, when the voltage Vb and the temperature Tb acquired this time are those during energization of the battery 11, the battery ECU 20 refers to the first map using the voltage Vb and the temperature Tb as arguments to calculate the index Ea1. For example, when the voltage Vb and the temperature Tb acquired this time are those during storage of the battery 11, the battery ECU 20 refers to the second map using the voltage Vb and the temperature Tb as arguments to calculate the index Ea2. The battery ECU 20 then updates the index Easum by adding the index Ea1 or index Ea2 calculated this time to the index Easum. The amount of decrease in electrolyte solution of each cell 12 can be monitored by updating and monitoring the index Easum. Based on the indices Easum of the cells 12, the battery ECU 20 outputs to the ECU 80 a command to limit the upper limit voltage of the battery 11, outputs to the ECU 80 a command to limit the input and output power of the battery 11, or outputs to the ECU 80 a command to notify an alert. This will be described in detail below with reference to FIG. 5.

Figure 5:
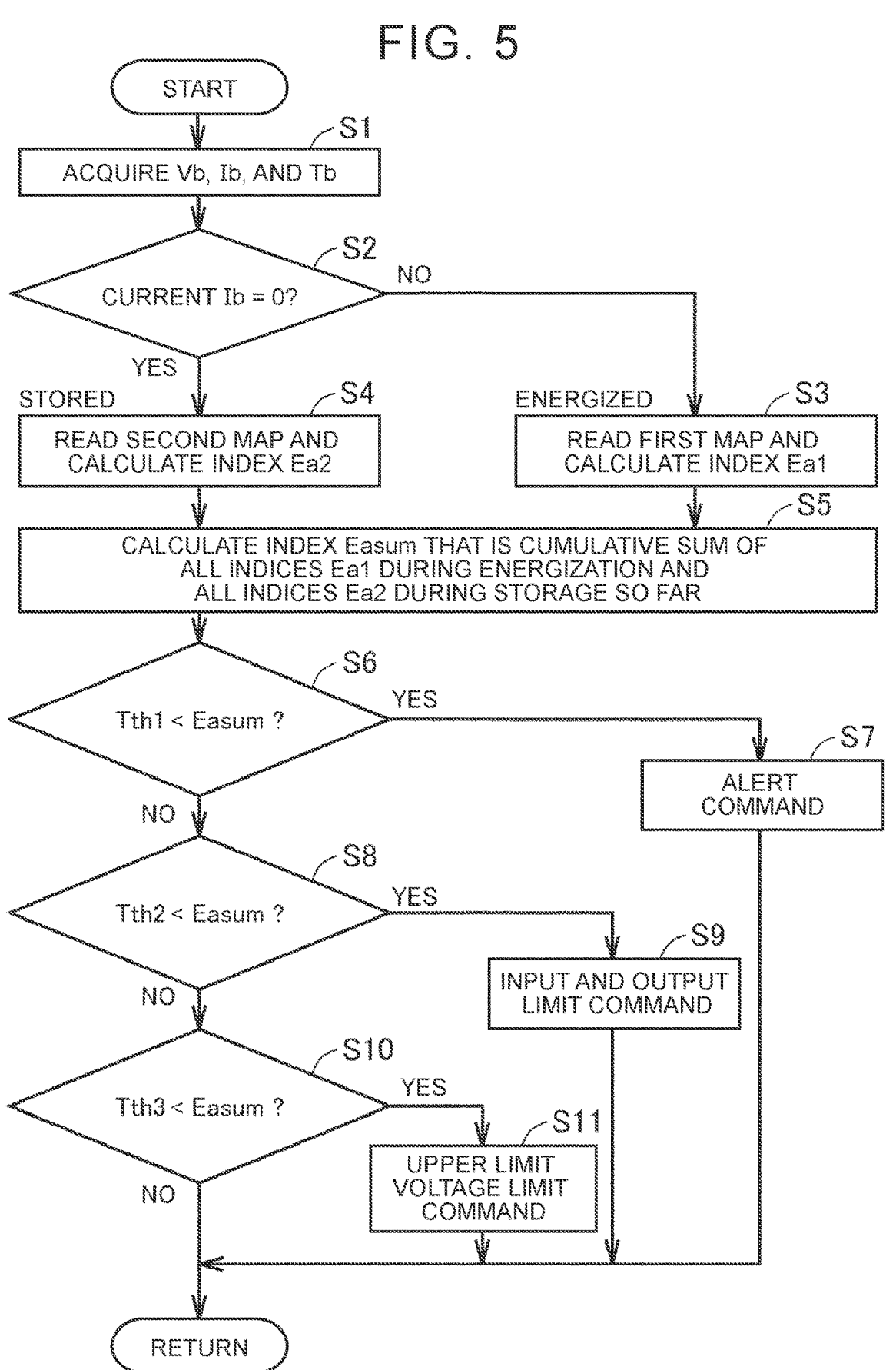
FIG. 5 is a flowchart of an estimation process.

FIG. 5 is a flowchart of the estimation process. This flowchart is started when the battery ECU 20 is started, and is repeatedly executed at every control cycle. The steps are implemented by software processing by the battery ECU 20.

However, the steps may be implemented by hardware (electric circuit) installed in the battery ECU 20. Hereinafter, the term "step" is abbreviated as "S."

In S1, the battery ECU 20 acquires the voltage Vb and current Ib of each cell 12 and the temperature Tb of each cell 12 from the voltage monitor module 16, the current sensor 17, and the temperature sensor 18 (acquires detection data).

In S2, the battery ECU 20 determines whether the detection data acquired in S1 (plurality of voltages Vb and currents Ib and plurality of temperatures Tb) is data during energization (discharging or charging) of the battery 11 or data during storage of the battery 11. Specifically, the battery ECU 20 determines the state of the battery 11 (the battery 11 is energized or stored) based on the current Ib acquired in S1. When the current Ib is not zero (NO in S2), the battery ECU 20 determines that the battery 11 is energized (that is, the detection data acquired in S1 is data during energization of the battery 11), and the process proceeds to S3. When the current Ib is zero (YES in S2), the battery ECU 20 determines that the battery 11 is stored (that is, the detection data acquired in S1 is data during storage of the battery 11), and the process proceeds to S4.

In S3, the battery ECU 20 reads the first map from the memory 22. For each cell 12, the battery ECU 20 refers to the first map using the voltage Vb and the temperature Tb acquired in S1 as arguments, and calculates the index Ea1 indicating the amount of decrease in electrolyte solution in the current control cycle (unit time). The process then proceeds to S5.

In S4, the battery ECU 20 reads the second map from the memory 22. For each cell 12, the battery ECU 20 refers to the second map using the voltage Vb and the temperature Tb acquired in S1 as arguments, and calculates the index Ea2 indicating the amount of decrease in electrolyte solution in the current control cycle (unit time). The process then proceeds to S5.

In S5, the battery ECU 20 reads the index Easum of each cell 12 from the memory 22. The index Easum is a cumulative sum of all the indices Ea1 during energization and all the indices Ea2 during storage so far. For each cell 12, the battery ECU 20 adds to the index Easum the index Ea1 calculated in S3 or the index Ea2 calculated in S4 as the index in this cycle (amount of decrease in electrolyte solution in the current unit time). The index Easum is prepared for each cell 12.

For each cell 12, the battery ECU 20 compares the index Easum with each threshold in S6, S8, and S10 that will be described below. The memory 22 of the battery ECU 20 stores a first threshold Tth1, a second threshold Tth2 (<Tth1), and a third threshold Tth3 (<Tth2). The first threshold Tth1, the second threshold Tth2, and the third threshold Tth3 are set with the first threshold Tth1 being the largest, followed by the second threshold Tth2 and the third threshold Tth3. The first threshold Tth1 is a threshold for determining whether to alert the user of the vehicle 1. The first threshold Tth1 can be set to, for example, a value indicating that the amount of electrolyte solution in the cell 12 is zero plus a certain margin. The second threshold Tth2 is a threshold for determining whether to limit the input and output power of the battery 11. The second threshold Tth2 can be set to the first threshold Tth1 plus a margin. The third threshold Tth3 is a threshold for determining whether to limit the upper limit voltage of the battery 11. The third threshold Tth3 can be set to the second threshold Tth2 plus a margin. The magnitudes of the margins for the thresholds can be set as appropriate based on, for example, the specifications of the battery 11 (cells 12).

In S6, the battery ECU 20 reads the first threshold Tth1 from the memory 22 and compares the indices Easum of the cells 12 with the first threshold Tth1. When at least one of the indices Easum of the cells 12 is greater than the first threshold Tth1 (YES in S6), the process proceeds to S7. When all of the indices Easum of the cells 12 are equal to or less than the first threshold Tth1 (NO in S6), the process proceeds to S8.

In S7, the battery ECU 20 outputs to the ECU 80 a command to notify an alert. In response to this command, the ECU 80 controls the notification device 70 to notify an alert. The alert may be, for example, an alert for inspection of the battery 11 or an alert for replacement of the battery 11. The notification device 70 may notify the alert by display on the display device, by audio output from the audio output device, or by both display on the display device and audio output from the audio output device.

In S8, the battery ECU 20 reads the second threshold Tth2 from the memory 22 and compares the indices Easum of the cells 12 with the second threshold Tth2. When at least one of the indices Easum of the cells 12 is greater than the second threshold Tth2 (YES in S8), the process proceeds to S9. When all of the indices Easum of the cells 12 are equal to or less than the second threshold Tth2 (NO in S8), the process proceeds to S10.

In S9, the battery ECU 20 outputs to the ECU 80 a command to limit the input and output power of the battery 11. In response to this command, the ECU 80 determines to limit the input and output power of the battery 11 to a preset input and output limit value. The input and output power of the battery 11 is thus limited from this point on.

In S10, the battery ECU 20 reads the third threshold Tth3 from the memory 22 and compares the indices Easum of the cells 12 with the third threshold Tth3. When at least one of the indices Easum of the cells 12 is greater than the third threshold Tth3 (YES in S10), the process proceeds to S11. When all of the indices Easum of the cells 12 are equal to or less than the third threshold Tth3 (NO in S10), the process proceeds to return.

In S11, the battery ECU 20 outputs to the ECU 80 a command to limit the upper limit voltage of the battery 11. In response to this command, the ECU 80 determines to limit the upper limit voltage of the battery 11 to a preset upper limit limit value. The upper limit voltage of the battery 11 is thus limited from this point on.

As described above, in the present embodiment, the first map for calculating the index Ea1 indicating the amount of decrease in electrolyte solution in each cell 12 per unit time during energization of the battery 11 and the second map for calculating the index Ea2 indicating the amount of decrease in electrolyte solution in each cell 12 per unit time during storage of the battery 11 are created in advance by experiments and stored in the memory 22 of the battery ECU 20. The battery ECU 20 acquires the voltage Vb and current Ib of each cell 12 and the temperature Tb of each cell 12 from the voltage monitor module 16, the current sensor 17, and the temperature sensor 18 (acquires detection data) in every unit time. Based on the current Ib, the battery ECU 20 determines whether the acquired detection data is data during energization of the battery 11 or data during storage of the battery 11. When the detection data is data during energization of the battery 11, the battery ECU 20 calculates, for each cell 12, the index Ea1 based on the first map using the voltage Vb and the temperature Tb as arguments. When the detection data is data during storage of the battery 11, the battery ECU 20 calculates, for each cell 12, the index Ea2 based on the second map using the voltage Vb and the temperature Tb as arguments. The battery ECU 20 updates the index Easum by adding the index Ea1 or index Ea2 calculated this time to the index Easum. The amount of decrease in electrolyte solution of each cell 12 can be monitored by calculating the index Ea1 or the index Ea2 in every unit time and updating the index Easum. Since the amount of decrease in electrolyte solution can be estimated using the detected voltage and temperature, the amount of decrease in electrolyte solution in each cell 12 can be accurately estimated.

For example, a method in which the amount of decrease in electrolyte solution is estimated by detecting gas generated by decomposition of the electrolyte solution is known in the art. However, in a cell that has a high aspect ratio Ar (e.g., 1.5 or more) and in which a separator contains a binder having an adhesive function, gas tends to remain in an electrode assembly. Therefore, the amount of decrease in electrolyte solution of the cell cannot be accurately estimated. With the above technique according to the present embodiment, the amount of decrease in electrolyte solution of a cell can be accurately estimated even for a cell that has a high aspect ratio Ar (e.g., 1.5 or more) and in which a separator contains a binder having an adhesive function.

When at least one of the indices Easum of the cells 12 is greater than the first threshold Tth1, the battery ECU 20 outputs to the ECU 80 a command to notify an alert. In response to this command, the ECU 80 controls the notification device 70 to notify an alert. Accordingly, it is possible to alert the user of the vehicle 1. The user can thus take appropriate action for the battery 11.

When at least one of the indices Easum of the cells 12 is equal to or less than the first threshold Tth1 and greater than the second threshold Tth2, the battery ECU 20 outputs to the ECU 80 a command to limit the input and output power of the battery 11. In response to this command, the ECU 80 determines to limit the input and output power of the battery 11. Since the input and output power of the battery 11 is limited, it is possible to slow down the decrease in electrolyte solution.

When at least one of the indices Easum of the cells 12 is equal to or less than the second threshold Tth2 and greater than the third threshold Tth3, the battery ECU 20 outputs to the ECU 80 a command to limit the upper limit voltage of the battery 11. In response to this command, the ECU 80 determines to limit the upper limit voltage of the battery 11. Since the upper limit voltage of the battery 11 is limited, it is possible to slow down the decrease in electrolyte solution.

The embodiment disclosed herein is illustrative in all respects and not restrictive. The scope of the present disclosure is shown by the claims rather than by the above description of the embodiment, and is intended to include all modifications within the meaning and scope equivalent to those of the claims.

What is claimed is:

1. A power supply device comprising:
a secondary cell including an electrolyte solution;
a detection device configured to detect a voltage of the secondary cell and a temperature of the secondary cell;
a storage device configured to store
first information indicating a relationship among the voltage of the secondary cell, the temperature of the secondary cell, and an amount of decrease in the electrolyte solution during energization of the secondary cell, and
second information indicating a relationship among the voltage of the secondary cell, the temperature of the secondary cell, and the amount of decrease in the electrolyte solution during storage of the secondary cell; and a control device configured to calculate a first index indicating the amount of decrease in the electrolyte solution, wherein the first index includes a second index indicating the amount of decrease in the electrolyte solution due to energization of the secondary cell, and a third index indicating the amount of decrease in the electrolyte solution due to storage of the secondary cell, the control device is configured to:

calculate the second index based on the voltage and the temperature detected by the detection device and the first information, when the secondary cell is energized, and calculate the third index based on the voltage and the temperature detected by the detection device and the second information, when the secondary cell is stored, and determines whether the secondary cell is energized or stored based on whether a current of the secondary cell is zero.

2. The power supply device according to claim 1, wherein:

the first information is created based on results of a cycle test of the secondary cell performed for each temperature; and the second information is created based on results of a storage test of the secondary cell performed for each temperature and each voltage.

3. The power supply device according to claim 2, wherein the control device is configured to output a command to notify an alert when the first index is greater than a first threshold.

4. The power supply device according to claim 3, wherein the control device is configured to output a command to limit input and output power of the secondary cell when the first index is equal to or less than the first threshold and greater than a second threshold that is smaller than the first threshold.

5. The power supply device according to claim 4, wherein the control device is configured to output a command to limit an upper limit voltage value of the secondary cell when the first index is equal to or less than the second threshold and greater than a third threshold that is smaller than the second threshold.

6. The power supply device according to claim 1, wherein:

the secondary cell includes an electrode assembly having an aspect ratio of 1.5 or more;

the electrode assembly is composed of a stack of a positive electrode, a negative electrode, and a separator located between the positive electrode and the negative electrode; and the separator includes a functional layer having a function to bond the positive electrode and the negative electrode to the separator.

7. The power supply device of claim 1, wherein the control device calculates and updates the first index for each cell included in the battery.

8. The power supply device of claim 1, wherein the control device separately calculates the amount of decrease in the electrolyte solution due to energization and due to storage by selectively using the first information and the second information, and updates the first index as a cumulative sum of the calculated decreases.

* * * * *